(12) United States Patent
Shinn et al.

(10) Patent No.: US 8,767,148 B2
(45) Date of Patent: Jul. 1, 2014

(54) COLOR FILTER AND DISPLAY DEVICE HAVING THE SAME

(75) Inventors: Ted-Hong Shinn, Hsinchu (TW); Fang-An Shu, Hsinchu (TW); Wen-Chung Tang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 167 days.

(21) Appl. No.: 13/558,358

(22) Filed: Jul. 26, 2012

(65) Prior Publication Data

US 2013/0128196 A1    May 23, 2013

(30) Foreign Application Priority Data

Nov. 17, 2011    (TW) .............................. 100142068 A

(51) Int. Cl.
*G02F 1/1335*    (2006.01)
*G02B 5/22*    (2006.01)
*G02B 26/00*    (2006.01)

(52) U.S. Cl.
USPC ............ 349/106; 349/108; 359/891; 359/296

(58) Field of Classification Search
USPC .......................... 349/106, 108; 359/891, 296
See application file for complete search history.

(56) References Cited

U.S. PATENT DOCUMENTS

| | | | | |
|---|---|---|---|---|
| 5,212,575 A | * | 5/1993 | Kojima et al. | 349/147 |
| 5,240,818 A | * | 8/1993 | Mignardi et al. | 430/321 |
| 6,577,374 B1 | * | 6/2003 | Nakata et al. | 349/156 |
| 6,724,425 B1 | * | 4/2004 | Moon et al. | 348/272 |
| 2013/0180949 A1 | * | 7/2013 | Weng et al. | 216/24 |

FOREIGN PATENT DOCUMENTS

| | | |
|---|---|---|
| EP | 1048700 B1 | 11/2006 |
| EP | 1936409 A1 | 6/2008 |
| EP | 1674897 B1 | 10/2008 |

OTHER PUBLICATIONS

TW Office Action that these art references were cited.

* cited by examiner

*Primary Examiner* — Mike Qi
(74) *Attorney, Agent, or Firm* — CKC & Partners Co., Ltd.

(57) ABSTRACT

Disclosed herein is a color filter, which includes a first substrate, a patterned color, resist layer, a patterned passivation layer, an adhesive layer and a second substrate. The patterned color resist layer is disposed on the first substrate. The patterned passivation layer is stacked on the patterned color resist layer. The adhesive layer covers the patterned protective layer. The second substrate is disposed on the adhesive layer. A display device having the color filter is disclosed herein as well.

10 Claims, 2 Drawing Sheets

COLOR FILTER AND DISPLAY DEVICE HAVING THE SAME

RELATED APPLICATIONS

This application claims priority to Taiwan application Serial Number 100142068, filed Nov. 17, 2011, the entirety of which is incorporated herein by reference.

BACKGROUND

1. Technical Field

The present disclosure relates to a color filter and a display device having the color filter.

2. Description of Related Art

There has been rapid progress in display technologies in recent years and one consequence of this has been the various different types of display devices that have been developed. Among the various types of display devices, much attention has been given to electronic ink display devices because of their low power consumption, minimal thickness, long lifespan and flexibility (i.e., some configurations are bendable).

Electronic ink display devices were first developed in the 1970s, and these early electronic ink display devices are characterized by having a number of charged spheres. Each of the charged spheres has a white surface and a black surface respectively arranged on opposite hemispherical surfaces. When an electronic field is applied, the charged spheres spin, and thus exhibit different colors.

In the 1990s, newly developed microcapsules replaced the charged spheres in electronic ink display devices. Such microcapsules are filled with colored oil and white charged particles. The white charged particles may move upward or downward when an electronic field is applied. When the white charged particles move upward (i.e., near the side of a viewer), the display device exhibits a white color in the area of these white charge particles. On the other hand, when the white charged particles move downward (i.e., away from the side of a viewer), the display device exhibits the color of the oil in the area of these white charged particles.

Conventional electronic ink display devices cannot display colorful images due to the limitations of the material used therein. Accordingly, there exists a need for a color filter that is suitable for use in electronic ink display devices.

SUMMARY

According to one aspect of the present disclosure, a color filter is provided. The color filter includes a first substrate, a patterned color resist layer, a patterned passivation layer, an adhesive layer and a second substrate. The patterned color resist layer includes a first color resist layer and a second color resist layer both disposed on the first substrate. The patterned passivation layer includes a first passivation layer and a second passivation layer respectively stacked on the first color resist layer and the second color resist layer, in which the first and second passivation layers are spaced apart by a gap so that a portion of the first substrate is exposed through the gap. The adhesive layer covers the patterned passivation layer and the portion of the first substrate. The second substrate is disposed on the adhesive layer.

According to another aspect of the present disclosure, a display device is provided. The display device includes an active array substrate, a light modulating layer and a color filter described hereinbefore. The light modulating layer is capable of modulating light and is disposed over the active array substrate. The color filter is disposed over the light modulating layer.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
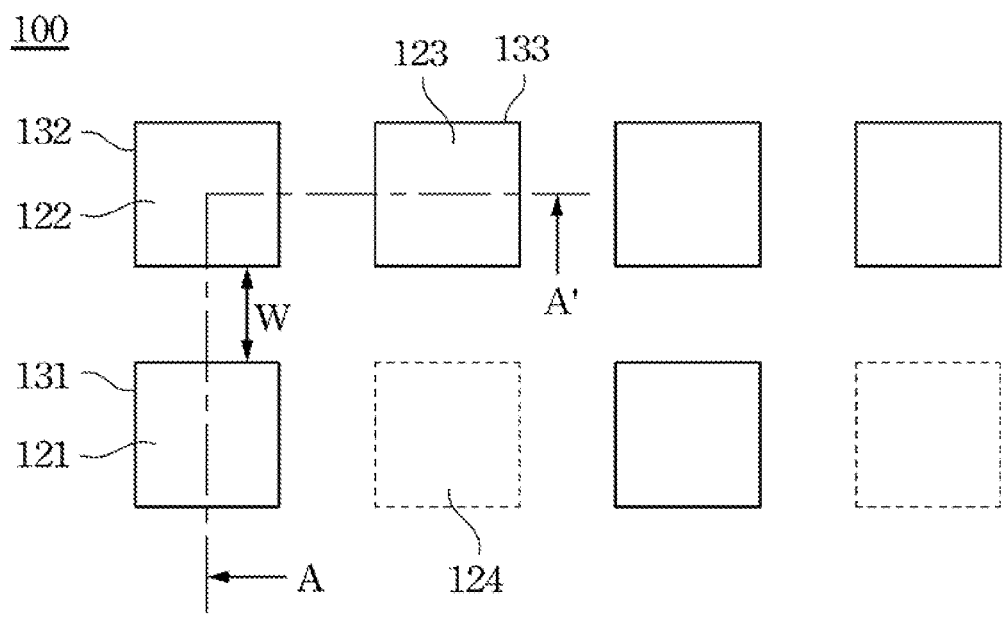
FIG. 1 is a top view schematically illustrating a color filter according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 2:
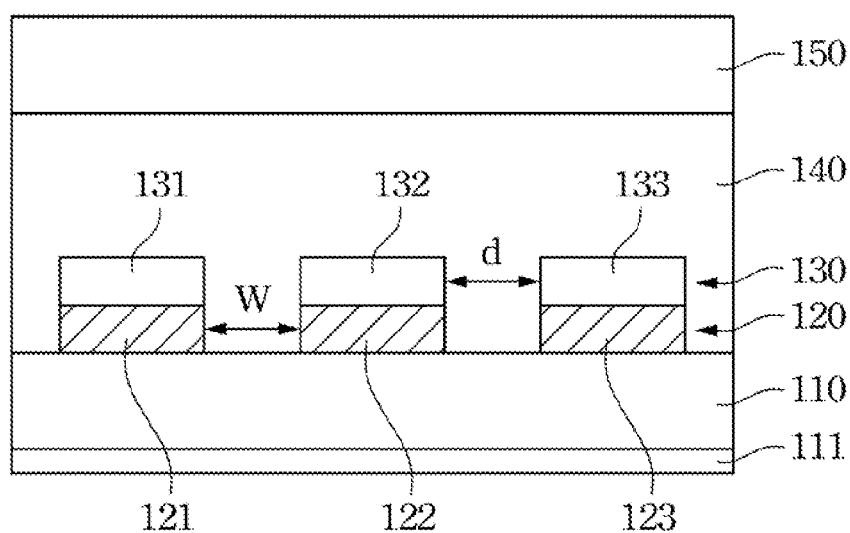
FIG. 2 is a cross-sectional view along line A-A' in FIG. 1.

According to one aspect of the present disclosure, a color filter is provided. FIG. 1 is a top view schematically illustrating a color filter 100 according to one embodiment of the present disclosure. FIG. 2 is a cross-sectional view along line A-A' in FIG. 1. The color filter 100 may be employed in an electronic ink display device, a liquid crystal display device or other types of display devices.

As depicted in FIG. 1 and FIG. 2, the color filter 100 includes a first substrate 110, a patterned color resist layer 120, a patterned passivation layer 130, a transparent adhesive layer 140 and a second substrate 150.

The first substrate 110 is provided for supporting the structures disposed thereon. The first substrate 110 may be made of a transparent material such as polyethylene terephthalate (PET) or glass. The first substrate 110 is not limited to any particular thickness, so long as it possesses a sufficient mechanical strength to support the structures formed thereon. In one example, the first substrate 110 includes a transparent conductive layer 111 disposed on a lower surface of the first substrate 110.

The patterned color resist layer 120 is disposed on the first substrate 110. The patterned color resist layer 120 at least includes a first color resist layer 121 and a second color resist layer 122. The first and second color resist layers 121, 122 are separated from each other, and both the color resist layers 121, 122 are formed on the first substrate 110. In one embodiment, the patterned color resist layer 120 further includes a third color resist layer 123 formed on the first substrate 110. Specifically, the first, second and third color resist layers 121, 122; 123 may be blue, green and red color resist layers, respectively. Any two adjacent color resist layers among the color resist layers 121, 122, 123 are spaced apart by a spacing W. The spacing W may be about 1-20 μm, for example. In another embodiment, the color filter 100 does not include any shielding layer (i.e., a black matrix) formed between two adjacent color resist layers, and therefore the region of the spacing W is transparent. In another embodiment, the first substrate 110 has a blank region 124, which does not include any color resist layer. The first, second and third color resist layers 121, 122, 123 and the blank region 124 may form a pixel of the color filter 100. A person of ordinary skill in the art will appreciate that the layout and/or arrangement of the patterned color resist layer 120 is not limited to those described above. While the areas of the first, second and third color resist layers 121, 122, 123 depicted in FIG. 1 are all the same, at least one of the first, second and third color resist layers 121, 122, or 123 may have an area that is different from the other color resist layers.

The patterned passivation layer 130 is configured to protect the patterned color resist layer 120, and prevents the patterned color resist layer 120 from undergoing change in chromaticity during manufacturing processes performed subsequent to the formation of the patterned color resist layer 120. The pattern of the patterned passivation layer 130 substantially corresponds to that of the patterned color resist layer 120. Specifically, the patterned passivation layer 130 includes a first passivation layer 131 and a second passivation layer 132 respectively stacked on the first and second color resist layers 121, 122. The first and second passivation layers 131, 132 are spaced apart by a gap "d" so that a portion of the first substrate 110 that is positioned between the first and second color resist layers 121, 122 may be exposed through the gap d. The width of the gap d may be about 1-20 μm, for example.

In one embodiment, the pattern of the patterned passivation layer 130 is aligned with that of the patterned color resist layer 120 in a top view. In particular, the patterned passivation layer 130 includes a first, a second and a third passivation layer 131, 132, 133 respectively aligned with the first, second and third color resist layers 121, 122, 123, as depicted in FIG. 1 and FIG. 2. In other words, the areas of the first, second and third passivation layers substantially equal the areas of the first, second and third color resist layers 131, 132, 133, respectively.

Figure 3:
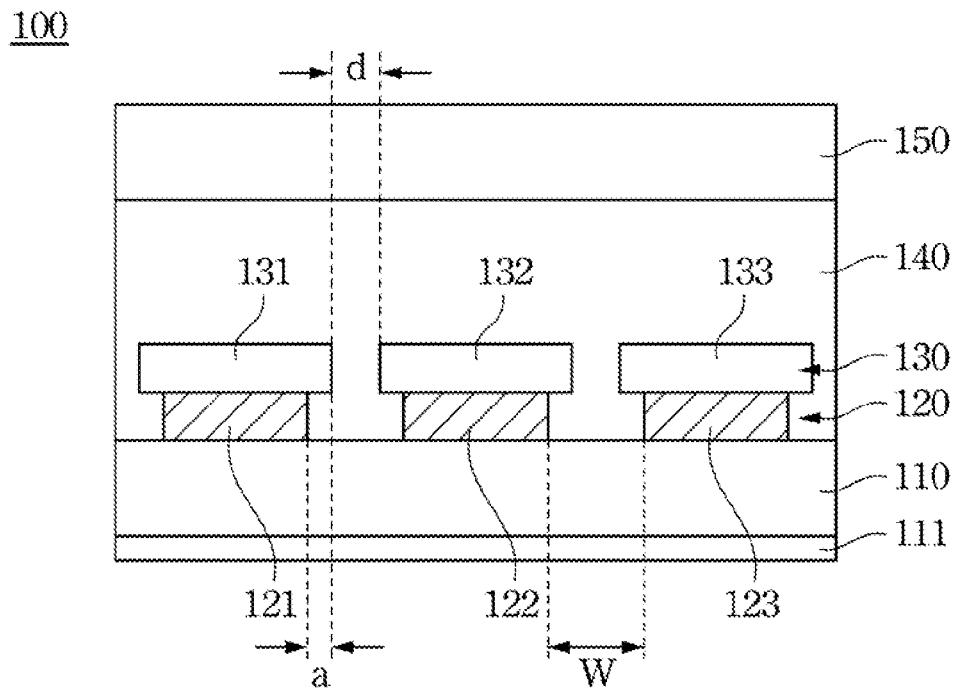
FIG. 3 is a cross-sectional view schematically illustrating a color filter according to another embodiment of the present disclosure.

In another embodiment, as depicted in FIG. 3, the areas of the first, second and third passivation layers 131, 132, 133 are respectively greater than the areas of the first, second and third color resist layers 121, 122, 123 such that the first, second and third passivation layers 131, 132, 133 respectively cover the first, second and third color resist layers 121, 122, 123. In one example, the edges of the first, second and third passivation layers 131, 132, 133 respectively extend past the edges of the first, second and third color resist layers 121, 122, 123 in a direction parallel to the surface of the substrate 110 by a distance "a" of about 1-5 μm.

The patterned passivation layer 130 may be made of a thermoplastic polymer such as polyvinyl butyral resin or polyvinyl chloride. The patterned passivation layer 130 may be about 1-30 μm in thickness, preferably about 2-10 μm.

The patterned passivation layer 130 may be formed by a laser transfer printing process, a thermal transfer printing process, an ink jet printing process or a photolithography process.

The transparent adhesive layer 140 is configured to bind the first substrate 110 and the structures thereon to the second substrate 150, as depicted in FIG. 2 and FIG. 3. The transparent adhesive layer 140 covers the patterned passivation layer 130 and a portion of the first substrate 110 located between the first and second color resist layers 121, 122.

It is noted that the chromaticity of the patterned color resist layer 120 may be unfavorably changed when the transparent adhesive layer 140 is in contact with the patterned color resist layer 120. Without being bound to any theory, it is believed that some interaction occurs between the patterned color resist layer 120 and the transparent adhesive layer 140. However, it is difficult to vary or adapt the material of the transparent adhesive layer 140 to suit the color resist layer 120 in view of the fact that the transparent adhesive layer 140 requires a high transmittance and a strong adhesion. Therefore, according to one embodiment of the present disclosure, the patterned passivation layer 130 is arranged on the patterned color resist layer 120 to reduce the contact area between the transparent adhesive layer 140 and the patterned color resist layer 120, or to even prevent contact between the patterned color resist layer 120 and the transparent adhesive layer 140.

Furthermore, the gap d of the patterned passivation layer 130 may facilitate removal of bubbles that are formed during the process of forming the transparent adhesive layer 140. In one example, the transparent adhesive layer 140 may be formed by laminating a dry film-type transparent adhesive on the first substrate 110. During the process of lamination, some bubbles may be trapped between the dry film-type transparent adhesive and the first substrate 110, especially at the spacing W between two adjacent color resist layers. In this example, in order to resolve the bubble issue, the transparent adhesive layer 140 may be made of a thermoplastic polymer which exhibits a desired flowability when heated. The bubbles trapped between the transparent adhesive layer 140 and the first substrate 110 may be removed by performing a de-bubble baking process. Stated differently, the transparent adhesive layer 140 may flow into the spacing W between two adjacent color resist layers via the gap d, so that the trapped bubbles may be removed. Accordingly, the gap d of the patterned passivation layer 130 facilitates removal of bubbles formed in the manufacturing process.

In a comparative example, a blanket polymeric passivation layer was used in place of the patterned passivation layer 130 to cover the patterned color resist layer 120. In this comparative example, a large number of bubbles became trapped in the spacing W between two color resist layers. Moreover, for the purpose of preventing the patterned color resist layer 120 from undergoing change in chromaticity, the composition of the passivation layer was restricted to certain materials that typically exhibit a low flowability at a high temperature. Therefore, it was difficult to remove the bubbles by a de-bubble baking process. In light of the above, according to one embodiment of the present disclosure, the patterned passivation layer 130 not only prevents the patterned color resist layer 120 from undergoing change in chromaticity, but also facilitates removal of bubbles formed in the manufacturing process.

The second substrate 150 is disposed on the transparent adhesive layer 140. The second substrate 150 is configured to protect the structures thereunder from being damaged by external impacts. The second substrate 150 may be made of a transparent material such as polyethylene terephthalate (PET) or glass. The second substrate 150 is not limited to any particular thickness, so long as it has a sufficient mechanical strength to protect the structures thereunder.

Figure 4:
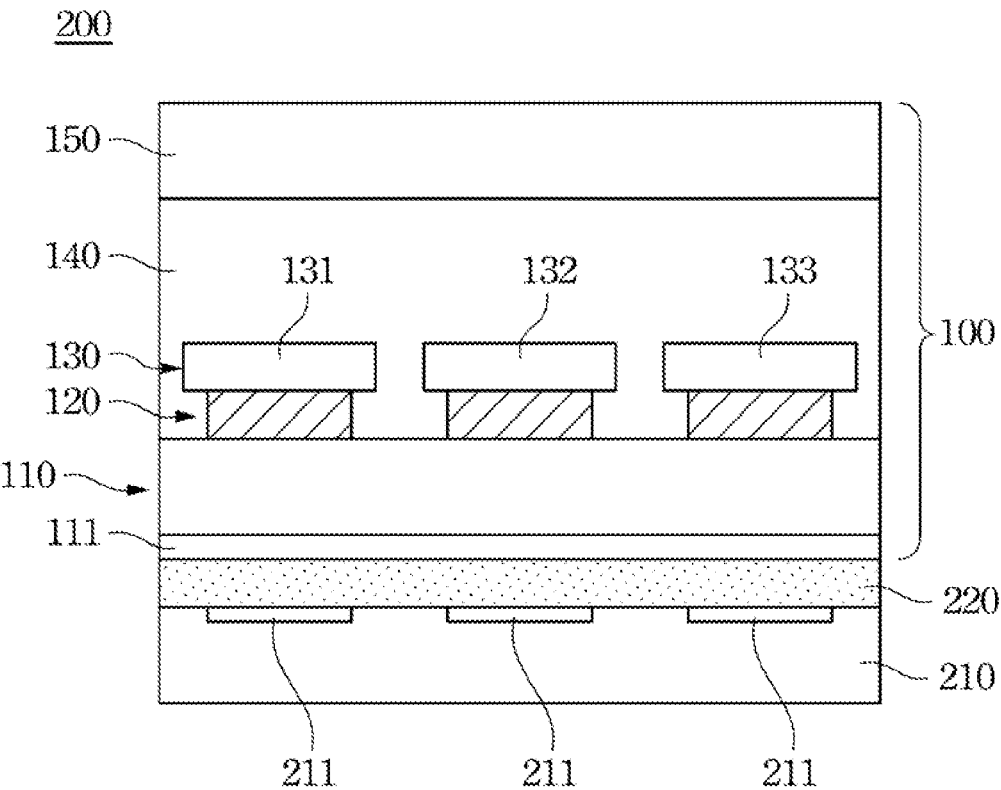
FIG. 4 is a cross-sectional view schematically illustrating a display device according to one embodiment of the present disclosure.

According to another aspect of the present disclosure, a display device is provided. FIG. 4 is a cross-sectional view schematically illustrating a display device 200 according to one embodiment of the present disclosure. The display device 200 includes an active array substrate 210, a light modulating layer 220 and a color filter 100.

The active array substrate 210 may be an array substrate including a plurality of thin film transistors and a plurality of pixel electrodes 211.

The light modulating layer 220 is positioned over the active array substrate 210 and is capable of modulating incident light. The light modulating layer 220 may be, for example, an electrophoretic layer or a liquid crystal layer. In examples, the electrophoretic layer may be a microcapsule-type electrophoretic layer, a microcup-type electrophoretic layer or a microgrove-type electrophoretic layer.

The color filter 100 is positioned above the light modulating layer 220. The color filter 100 may be any embodiment or example of the present disclosure described hereinbefore. In one example, the first substrate 110 of the color filter 100 has a transparent conductive layer 111 disposed on a lower surface thereof, and the light modulating layer 220 may be controlled by an electric field generated between the transparent conductive layer 111 and the pixel electrodes 211.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A color filter, comprising:
   a first substrate;
   a patterned color resist layer disposed on the first substrate, the patterned color resist layer comprising a first color resist layer and a second color resist layer;
   a patterned passivation layer comprising a first passivation layer and a second passivation layer respectively stacked on the first color resist layer and the second color resist layer, wherein the first passivation layer and the second passivation layer are spaced apart by a gap so that a portion of the first substrate is exposed through the gap;
   an adhesive layer covering the patterned passivation layer and the portion of the first substrate; and
   a second substrate disposed on the adhesive layer.

2. The color filter according to claim 1, wherein each of the first passivation layer and the second passivation layer has an area that substantially matches an area of the corresponding one of the first color resist layer and the second color resist layer, and the first passivation layer and the second passivation layer are aligned respectively with the first color resist layer and the second color resist layer in a top view.

3. The color filter according to claim 1, wherein the first passivation layer and the second passivation layer respectively cover the first color resist layer and the second color resist layer.

4. The color filter according to claim 3, wherein each of the first passivation layer and the second passivation layer has an edge extending past an edge of the corresponding one of the first color resist layer and the second color resist layer by 1-5 µm.

5. The color filter according to claim 1, each of the first passivation layer and the second passivation layer has an area greater than an area of the corresponding one of the first color resistor layer and the second color resist layer.

6. The color filter according to claim 1, wherein the gap is about 2-20 µm.

7. A display device, comprising:
   an active array substrate;
   a light modulating layer capable of modulating light, the light modulating layer being disposed over the active array substrate; and
   a color filter set forth in claim 1 disposed over the light modulating layer.

8. The display device according to claim 7, wherein the light modulating layer is an electrophoretic layer or a liquid crystal layer.

9. The display device according to claim 7, wherein the first passivation layer and the second passivation layer respectively cover the first color resist layer and the second color resist layer.

10. The display device according to claim 9, wherein each of the first passivation layer and the second passivation layer has an edge extending past an edge of the corresponding one of the first color resist layer and the second color resist layer by 1-5 µm.

* * * * *